United States Patent
Kim et al.

(10) Patent No.: US 6,594,384 B1
(45) Date of Patent: Jul. 15, 2003

(54) APPARATUS AND METHOD FOR ESTIMATING AND CONVERTING ILLUMINANT CHROMATICITY USING PERCEIVED ILLUMINATION AND HIGHLIGHT

(75) Inventors: Jeong-yeop Kim, Suwon (KR); Seong-deok Lee, Yongin (KR); Du-sik Park, Pohang (KR); Chang-young Kim, Euiwang (KR); Yang-seock Seo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/562,892

(22) Filed: May 1, 2000

(30) Foreign Application Priority Data

Nov. 15, 1999 (KR) ........................ 1999-50596

(51) Int. Cl.[7] ................................. G06K 9/00
(52) U.S. Cl. .................................... 382/162
(58) Field of Search ................ 362/162–167; 358/504–523; 345/597–606

(56) References Cited

U.S. PATENT DOCUMENTS

| | | | |
|---|---|---|---|
| 4,685,071 A | | 8/1987 | Lee |
| 5,495,428 A | | 2/1996 | Schwartz |
| 5,825,916 A | * | 10/1998 | Denber ............... 382/162 |
| 5,907,629 A | * | 5/1999 | Funt et al. ............ 382/162 |
| 6,038,339 A | * | 3/2000 | Hubel et al. ........... 382/162 |
| 6,249,601 B1 | * | 6/2001 | Kim et al. ............ 382/162 |

* cited by examiner

Primary Examiner—Jingge Wu
(74) Attorney, Agent, or Firm—Burns, Doane, Swecker & Mathis, L.L.P.

(57) ABSTRACT

A method and apparatus for estimating illuminant chromaticity and a method and apparatus for converting the estimated illuminant chromaticity into desired illuminant chromaticity using software are provided. The apparatus for estimating illuminant chromaticity includes an image input unit for receiving a color image, a highlight detector for extracting highlight regions from the color image, a highlight parameter calculator for mapping the highlight regions to chromaticity coordinates and calculating geometric presentation parameters of the shape of the distribution of chromaticity coordinates, a perceived illumination illuminant chromaticity estimator for estimating illuminant chromaticity in the color image using a perceived illumination estimate scheme, and a correct chromaticity calculator for selecting a predetermined number of geometric presentation parameters near the illuminant chromaticity estimated by the perceived illumination illuminant chromaticity estimator among the geometric presentation parameters and calculating final illuminant chromaticity using the selected geometric presentation parameters. The method for estimating illuminant chromaticity using perceived illumination and highlights is used for estimating illuminant chromaticity from a color image. This method, which is a combination of two kinds approaches, a perceived illumination estimate scheme and a highlight estimate scheme, considers the characteristics of highlights based on stable illuminant chromaticity estimated from perceived illumination, thereby improving accuracy.

17 Claims, 4 Drawing Sheets

APPARATUS AND METHOD FOR ESTIMATING AND CONVERTING ILLUMINANT CHROMATICITY USING PERCEIVED ILLUMINATION AND HIGHLIGHT

The following is based on Korean Patent Application No. 99-50596 filed Nov. 15, 1999, herein incorporated by reference.

BACKGROUND OF THE INVENTION

1. Field of the Invention

The present invention relates to a method and apparatus for estimating illuminant chromaticity and a method and apparatus for converting the estimated illuminant chromaticity into desired illuminant chromaticity using software.

2. Description of the Related Art

There are two kinds of methods in estimating illuminant chromaticity in a scene: one using hardware and the other using software. In methods using hardware, illuminant chromaticity is estimated based on direct measurement of a scene with a sensor which can estimate illuminant information. In methods using software, the illuminant chromaticity of the scene is estimated from an acquired image input. The former is simply implemented, but it is difficult to improve the accuracy. The later is more advantageous in improving the accuracy than the former, but its implementation is complex. Recently, however, as microprocessors are developed, the implementation of the latter method using software becomes simpler.

According to a conventional technique, an illuminant component is detected using hardware attached to a camera to perform white balance or color correction. A detector or the like for detecting light directly emitted from a light source is mounted within a camera. Alternatively, a control button corresponding to a particular illuminant is fixed on a camera, and the illuminant chromaticity is determined based on the input by a user using the control button.

However, the method using a detector has a problem of an increase in cost due to additional hardware. Moreover, this method is difficult to be adapted to an image obtained by remote shooting in which the direct detection of an illuminant by hardware is impossible. In the method using a control button operated by a user, many control buttons are needed to appropriately correspond to various illuminant components.

To solve these problems, a method of detecting illuminant chromaticity from the image itself is disclosed in U.S. Pat. No. 4,685,071, issued to Hsien-Che Lee on Aug. 4, 1987. In this method, the color of the specularly reflected light from the scene in an image and the color of light employed to illuminate the scene is determined. According to this method, the color of specularly reflected light can be detected by detecting a plurality of sets of points having constant hue and varying saturation on a plurality of differently colored surfaces in the image. To detect color changes independent of brightness, the image is transformed to a color space having chromaticity coordinates, and color edges where the color of the image is changing most rapidly are detected. In this case, to determine whether the rapid color changes are due to a change in saturation or hue, data sets on both sides of the rapid color change edge are collected to fit straight lines. When the slopes of the straight lines fit through the data sets collected from both sides of the edge are equal, it is determined that the rapid color changes are due to changes in saturation and that the data sets are for detection of the color of the illuminant. Parameters for determining the illuminant color are obtained from the paths of intersections of the straight lines obtained from the plurality of data sets near the edges due to the changes in saturation.

A major problem of the method of Hsien-Che Lee is the amount of operating time required. In addition, the collection of data on both sides from data at each edge is not easy. Since the operation is performed in the unit of edges, the operation of collecting data from both sides, fitting straight lines, and comparing and determining the straight lines are repeatedly performed for a lot of edges.

A method disclosed in U.S. Pat. No. 5,495,428, issued to Schwartz et al. on Feb. 27 1996, has a very similar conception to that of the method of Hsien-Che Lee. The method of Schwartz et al. determines illuminant chromaticity by plotting a histogram for an entire image, obtaining straight lines which are major axes for respective clusters, and appropriately weighting each straight line. Thus, it is similar to the method of Hsien-Che Lee in conception. However, the two methods are different in operation. The method of Hsien-Che Lee is advantageous in obtaining data to be processed. However, the method has a disadvantage of requiring a large amount of computation and complexity for analysis. In the method of Schwartz et al., it is difficult to obtain data to be processed, but analysis is simply performed.

A perceived illumination estimate scheme represents the illuminant chromaticity of an image in numbers and sorts out and excludes self-luminous regions, thereby effectively and stably estimating the illuminant chromaticity. A highlight estimate scheme is based on the dichromatic reflection model by Shafer in which it is assumed that light reflected from a constantly colored surface can be represented by the synthesis of surface reflection and body reflection and that the spectral composition of the surface reflection is the same as the spectral composition of an illuminant.

The perceived illumination estimate scheme guarantees stability in determining the approximate range of solutions, but has an accuracy problem due to dependence on the content of an input image. The highlight estimate scheme is advantageous in that it does not depend on the content of an input image and provides relatively accurate solutions. However, the highlight estimate scheme is disadvantageous in that many candidates, that is, intersections in a considerable range, must be considered to determine a final solution.

SUMMARY OF THE INVENTION

To solve the above problems, it is an objective of the present invention to provide an apparatus and method for estimating and converting illuminant chromaticity at high accuracy by considering the characteristic of a highlight based on relatively stable illuminant chromaticity estimated from perceived illumination.

Accordingly, to achieve the above objective in one embodiment, there is provided an illuminant chromaticity estimating apparatus including an image input unit for receiving a color image, a highlight detector for extracting highlight regions from the color image, a highlight parameter calculator for mapping the highlight regions to chromaticity coordinates and calculating geometric presentation parameters of the shape of the distribution of chromaticity coordinates, a perceived illumination illuminant chromaticity estimator for estimating illuminant chromaticity in the color image using a perceived illumination estimate scheme, and a correct chromaticity calculator for selecting from among the geometric presentation parameters a predetermined number of geometric presentation parameters near the illuminant chromaticity estimated by the perceived illumination illuminant chromaticity estimator and calculating final illuminant chromaticity using the selected geometric presentation parameters.

The perceived illumination illuminant chromaticity estimator includes an image average calculator for calculating the average value of the color image, a self-luminous threshold setting unit for multiplying the average value of the color image by a predetermined coefficient and setting a result value as a self-luminous threshold, a self-luminous region remover for removing self-luminous regions having chromaticity coordinates exceeding the self-luminous threshold from the color image, a self-luminous threshold change determiner for outputting the color image from which the self-luminous regions have been removed instead of the color image input to the image average calculator when the difference between a current self-luminous threshold and a previous self-luminous threshold exceeds a predetermined value, and an illuminant chromaticity calculator for calculating illuminant chromaticity from the average value of the color image from which the self-luminous regions have been removed.

In another embodiment, there is provided an illuminant chromaticity converting apparatus including an illumination color temperature calculator for calculating a color temperature corresponding to the estimated illuminant chromaticity in a random color image, a tristimulus value calculator for calculating a plurality of estimation reference color values corresponding to the color temperature calculated by the illumination color temperature calculator and a plurality of target reference color values corresponding to a target color temperature, a conversion coefficient calculator for calculating conversion coefficients using the plurality of estimation reference color values and the plurality of target reference color values to produce a conversion matrix, and an illuminant chromaticity change unit for applying the conversion matrix to an input color image to change the chromaticity of an illuminant in the input color image.

The illuminant chromaticity converting apparatus also includes a brightness converter for calculating the average value of brightness of the input color image who's illuminant chromaticity has been changed and a shift offset corresponding to a target environment, adding the calculated shift offset to the RGB elements of the input color image who's illuminant chromaticity has been changed, and expanding the contrast of the input color image.

In yet another embodiment, there is provided an illuminant chromaticity estimating method including the steps of (a) receiving a color image; (b) extracting highlight regions from the color image; (c) mapping the highlight regions to chromaticity coordinates and calculating geometric presentation parameters of the shape of the distribution of chromaticity coordinates; (d) estimating illuminant chromaticity in the color image using a perceived illumination estimate scheme; and (e) selecting from among the geometric presentation parameters a predetermined number of geometric presentation parameters near the illuminant chromaticity estimated in the step (d) and calculating final illuminant chromaticity using the selected geometric presentation parameters.

The step (d) includes the sub steps of (d1) calculating the average value of the color image; (d2) multiplying the average value of the color image by a predetermined coefficient and setting a result value as a self-luminous threshold; (d3) removing self-luminous regions having chromaticity coordinates exceeding the self-luminous threshold from the color image; (d4) repeating the steps (d1) through (d3) until the difference between a current self-luminous threshold and a previous self-luminous threshold is smaller than a predetermined value; and (d5) calculating illuminant chromaticity from the average value of the color image who's self-luminous regions have been removed.

In still yet another embodiment, there is provided an illuminant chromaticity converting method includes the steps of (a) calculating a color temperature corresponding to the estimated illuminant chromaticity in a random color image; (b) calculating a plurality of estimation reference color values corresponding to the calculated color temperature; (c) calculating a plurality of target reference color values corresponding to a target color temperature; (d) calculating conversion coefficients using the plurality of estimation reference color values and the plurality of target reference color values to produce a conversion matrix; and (e) applying the conversion matrix to an input color image to change the chromaticity of an illuminant in the input color image.

The illuminant chromaticity converting method also includes the step of calculating the average value of brightness of the input color image who's illuminant chromaticity has been changed and a shift offset corresponding to a target environment, adding the calculated shift offset to the RGB elements of the input color image who's illuminant chromaticity has been changed, and expanding the contrast of the input color image.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

A perceived illumination estimate scheme and a highlight estimate scheme complement each other so that the result of the perceived illumination estimate scheme can be set as an initial state in which the approximate range of final solutions is determined. Then, accurate solutions can be determined taking into account the characteristics of candidates extracted according to the highlight estimate scheme and distribution clusters based on this initial state.

A method of detecting illuminant chromaticity using perceived illumination represents the illuminant chromaticity of an image in numbers and sorts out and excludes self-luminous regions, thereby effectively and stably estimating the illuminant chromaticity. When a person watches a scene, they perceive a particular color cast as a whole. Such color cast varies with the characteristics of illumination. A person perceives a red color as a whole under incandescent light while a person perceives a blue color as a whole under daylight. The perceived illumination estimate scheme is characterized by digitizing the color cast which is perceived by a person as a whole.

A self-luminous region is not the surface of an object from which light is reflected, but a portion recognized together with illuminant in an image. The self-luminous region may be an aperture through which light passes or a specular reflection. In the method of detecting illuminant chromaticity using perceived illumination, accuracy of estimation can be increased by effectively excluding self-luminous regions.

Figure 1:
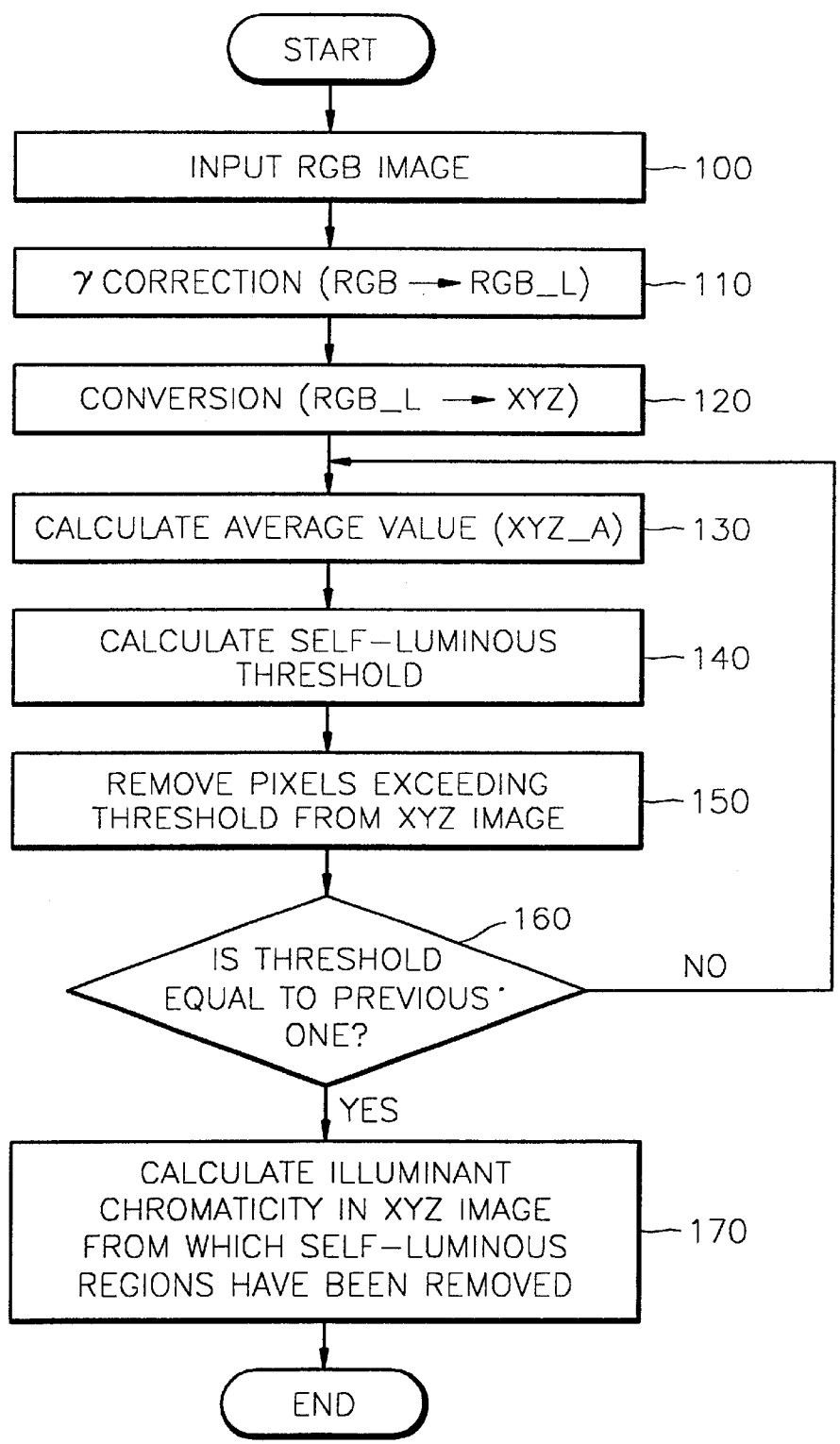
FIG. 1 is a flowchart for showing a procedure of estimating illuminant chromaticity according to a perceived illumination estimate scheme.

According to FIG. 1, a procedure of detecting illuminant chromaticity using perceived illumination is as follows. Primarily, in steps 100 and 110, a linearlized input image RGB_L(i, j) is obtained by γ compensation of shooting equipment with respect to an input image RGB(i, j).

$$R\_L(i, j) = R(i, j)^{1/\gamma}$$
$$G\_L(i, j) = G(i, j)^{1/\gamma} \quad (1)$$
$$B\_L(i, j) = B(i, j)^{1/\gamma}$$

where i and j are coordinates of each pixel.

In step 120, the linearlized input image RGB_L(i, j) in an RGB coordinate system is converted into an image XYZ(i, j) in an XYZ coordinate system by $$\begin{bmatrix} X \\ Y \\ Z \end{bmatrix} = [M] \begin{bmatrix} R \\ G \\ B \end{bmatrix} \quad (2)$$

where M is a previously calculated conversion matrix.

In step 130, an image average XYZ_A for the converted image XYZ(i, j) is calculated using $$X\_A = \frac{1}{(Row \times Col)} \sum_{i=0}^{Row-1} \sum_{j=0}^{Col-1} X(i, j)$$
$$Y\_A = \frac{1}{(Row \times Col)} \sum_{i=0}^{Row-1} \sum_{j=0}^{Col-1} Y(i, j) \quad (3)$$
$$Z\_A = \frac{1}{(Row \times Col)} \sum_{i=0}^{Row-1} \sum_{j=0}^{Col-1} Z(i, j)$$

In step 140, a self-luminous threshold is calculated by multiplying the image average XYZ_A by a predetermined constant k.

$$X\_th = k \times X\_A$$
$$Y\_th = k \times Y\_A \quad (4)$$
$$Z\_th = k \times Z\_A$$

In step 150, pixels exceeding the self-luminous threshold are removed from the image XYZ(i, j).

In step 160, the self-luminous threshold is compared with a previously stored self-luminous threshold. When the difference between the self-luminous thresholds exceeds a predetermined value near to 0, the steps 130 through 150 are repeatedly performed with respect to the image XYZ(i, j) from which the pixels exceeding the threshold are removed. When the difference between the self-luminous thresholds is smaller than the predetermined value near to 0 in the step 160, a current image average value is expressed as XYZ_f, estimated as XYZ of an illuminant, and used when calculating chromaticity.

$$Illu\_x = \frac{X\_f}{X\_f + Y\_f + Z\_f} \quad (5)$$
$$Illu\_y = \frac{Y\_f}{X\_f + Y\_f + Z\_f}$$

The values Illu_x and Illu_y are determined as the illuminant chromaticity of a corresponding scene in step 170.

A method of detecting illuminant chromaticity using highlights is based on the dichromatic reflection model by Shafer in which it is assumed that light reflected from a constantly colored surface can be represented by the synthesis of surface reflection and body reflection and that the spectral composition of the surface reflection is the same as the spectral composition of an illuminant. The chromaticity coordinates CIE(x, y) of different points on the same surface lie on a line connecting illuminant colors determined by the surface reflection and body colors determined by the body reflection in a chromaticity diagram. This means that a surface reflection component simply weakens the saturation of a body reflection component. It is known that the colors on the chrometrically homogeneous surface are different in degree of purity but have the same dominant wavelength on an illuminant color. The paths of the points form lines in a radial manner about illuminant chromaticity. When a surface has different two spectral reflection characteristics, two lines determine a single intersection and this intersection determines illuminant chromaticity.

The following description concerns a procedure of detecting illuminant chromaticity using highlights. In steps 200 and 210 of FIG. 2, candidate regions for highlights are selected from the input image RGB(i, j). A selection reference is set such that the intensity of a pixel has a value obtained by multiplying the average brightness of the entire image by a constant $$I(i, j) + 0.3 \times R(i, j) + 0.6 \times G(i, j) + 0.1 \times B(i, j) \quad (6)$$
$$I\_A = \frac{1}{(Row \times Col)} \sum_{i=0}^{Row-1} \sum_{j=0}^{Col-1} Y(i, j)$$
$$I\_th = 2.7 \times I\_A$$

wherein the constant is set to 2.7 in this description, but the value is not fixed and may vary with the characteristic of an input image. The absolute value of brightness greatly varies for different images so that the absolute value of brightness cannot be used as a reference.

In step 220, slopes and intercepts, which are the line parameters of the extracted candidate regions, are calculated. In a conventional method of extracting line parameters, lines are plotted on the basis of the long axis of a chromaticity distribution of a region which is mapped into chromaticity coordinates, and the slopes and intercepts of the lines are calculated. According to this conventional method, an accurate result can be obtained if a candidate region is correctly selected, but it is very difficult to accurately extract a correct candidate region. The following description concerns a method of accurately extracting the line parameters even when a correct candidate region is not selected.

Figure 3:
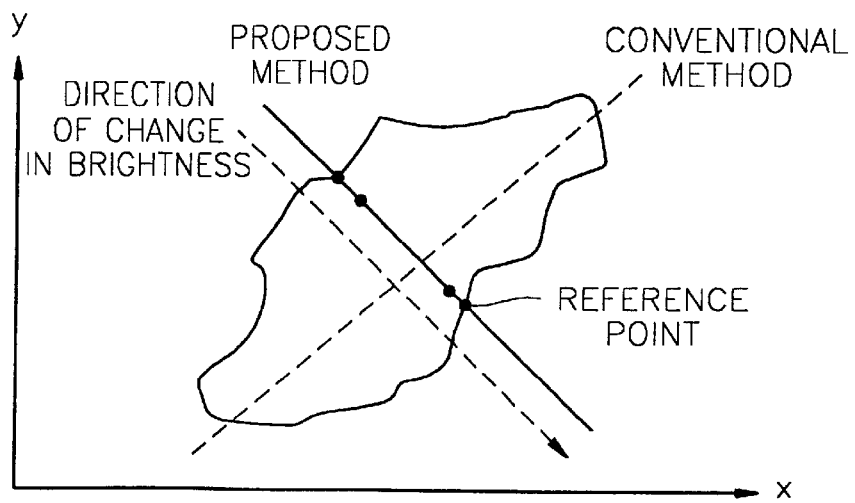
FIG. 3 is a diagram for explaining a procedure of extracting line parameters from chromaticity coordinates.

Every XYZ(i, j) in a candidate region is standardized to calculate chromaticity coordinates xy(i, j). In this proposed method, the chromaticity coordinates xy(i, j) and brightness information Y(i, j) are used. Pairs of xy(i, j) and Y(i, j) are arranged in the order of ascending powers with reference to Y(i, j). A moving window average from the darkest portion to the brightest portion is calculated. Since the number of pixels in a candidate region usually exceeds 100, the size of a window is set to about 20 samples. It is important to estimate the direction of a change in chromaticity according to a change in brightness in the distribution of chromaticity coordinates. In other words, four or five sets of chromaticity coordinates having a strong linearity are extracted, and the line parameters are extracted based on them. In FIG. 3, the conventional method and the present proposed method for extracting a line are compared in a chromaticity plane.

In step 230, the intersections of lines are calculated using the sets of line parameters of all the candidate regions and expressed as c(x, y). The most representative intersection is selected from the set of calculated intersections in step 240.

A conventional method of selecting the most representative intersection uses a histogram. According to the conventional method, a bin should desirably be divided into very small units when the data accuracy of intersections is high, so processing is very difficult. To solve this problem, the following method is proposed in the present invention.

One intersection has two coordinate values x and y. The intersections are arranged in the order of ascending powers with reference to x values. When arranging the order of the intersections with reference to x values, each y value itself is meaningless. As a result of such ordering, the set of x values which approximates a slow cubic curve is obtained. The most flat region at the center of the cubic curve corresponds to a section having a representative property. In the present invention, x coordinate values of the intersections are fitted to a cubic curve, and the x value of the inflection point of the cubic curve is selected as a representative x value. An x section including a predetermined amount of samples around the representative x value is set. The y values within the set x section are fitted to a cubic curve in the same manner as that for the x values, and a representative y value is obtained. This method is more effective than the method using a histogram when a high accuracy is desired due to dense chromaticity distribution, thereby solving the problem of a descent of accuracy on the size of the bin of a histogram. When selecting a representative point in the presently proposed method, the inflection point of a cubic curve may be used, or among a set of intersections, an intersection nearest to a point selected using an inflection point may be selected as a representative point. Finally, a representative point (x, y) obtained through the above operation is output as illuminant chromaticity in step 250.

A method for estimating illuminant chromaticity using perceived illumination and highlights according to the present invention, is used for estimating illuminant chromaticity from a color image. This method, which is a combination of two kinds of approaches, a perceived illumination estimate scheme and a highlight estimate scheme, considers the characteristics of highlights based on stable illuminant chromaticity estimated from perceived illumination, thereby improving accuracy.

The perceived illumination estimate scheme guarantees stability in determining the approximate range of solutions, but has an accuracy problem due to dependence on the content of an input image. The highlight estimate scheme is advantageous in that it does not dependent on the content of an input image and provides relatively accurate solutions. However, the highlight estimate scheme is disadvantageous in that many candidates, that is, intersections in a considerable range, must be considered to determine a final solution. The two estimate schemes complement each other so that the result of the perceived illumination estimate scheme can be set as an initial state in which the approximate range of final solutions is determined. Then, accurate solutions can be determined taking into account the characteristics of candidate points extracted according to the highlight estimate scheme and the characteristics of the shapes of chromaticity distributions, based on the initial state. This is the major conception of the present invention.

Figure 4:
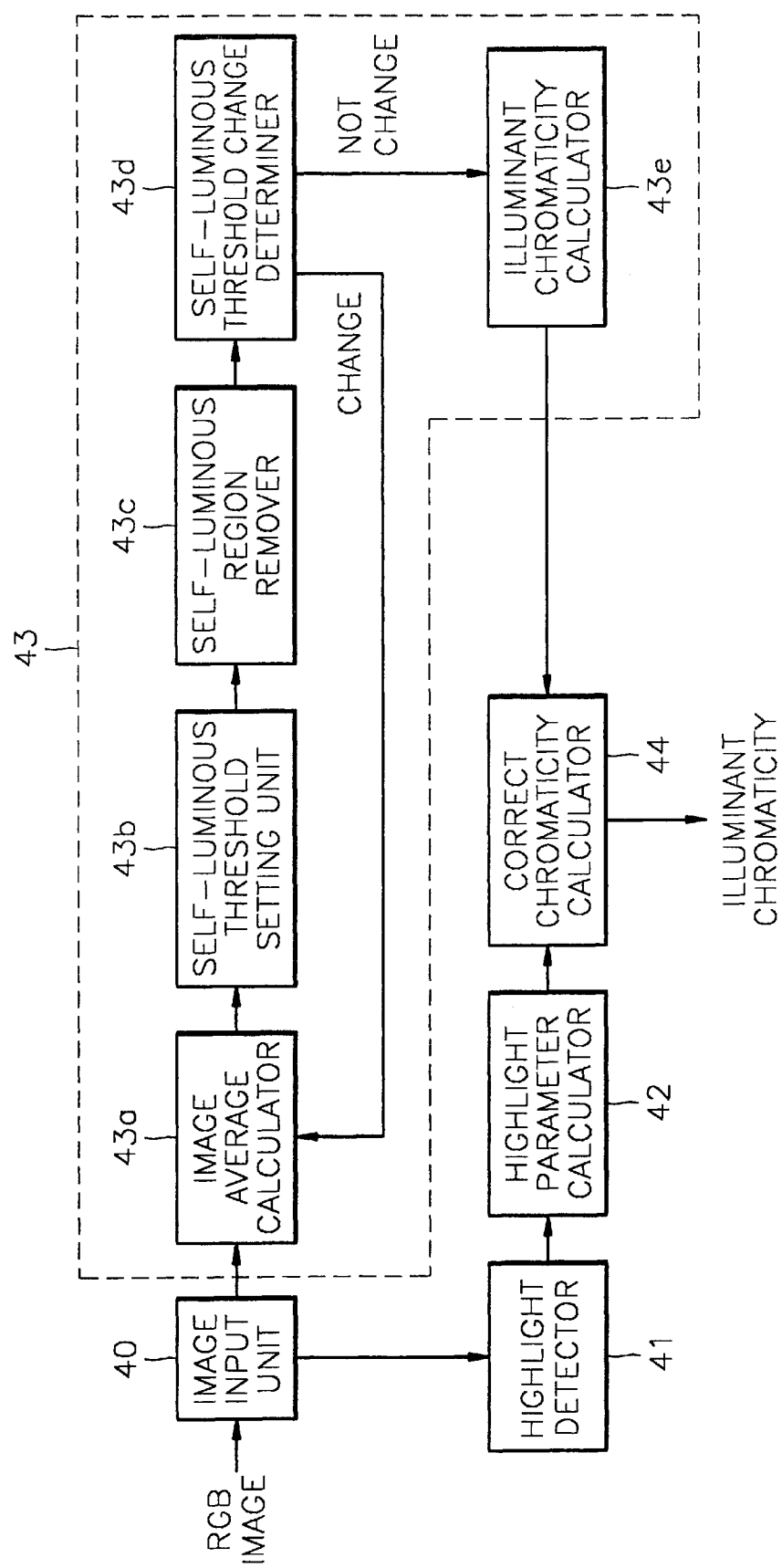
FIG. 4 is a block diagram of an illuminant chromaticity estimating apparatus using perceived illumination and highlights according to an embodiment of the present invention.

Referring to FIG. 4, a illuminant chromaticity estimating apparatus using perceived illumination and highlights according to an embodiment of the present invention, includes an image input unit 40, a highlight detector 41, a highlight parameter calculator 42, a perceived illumination illuminant chromaticity estimator 43 and a correct chromaticity calculator.

The image input unit 40 receives an arbitrary color image. The image input unit 40 may be equipped with a y correction function and an RGB-to-XYZ color coordinate conversion function, which are performed in the steps 110 and 120 of FIG. 1, respectively.

Figure 2:
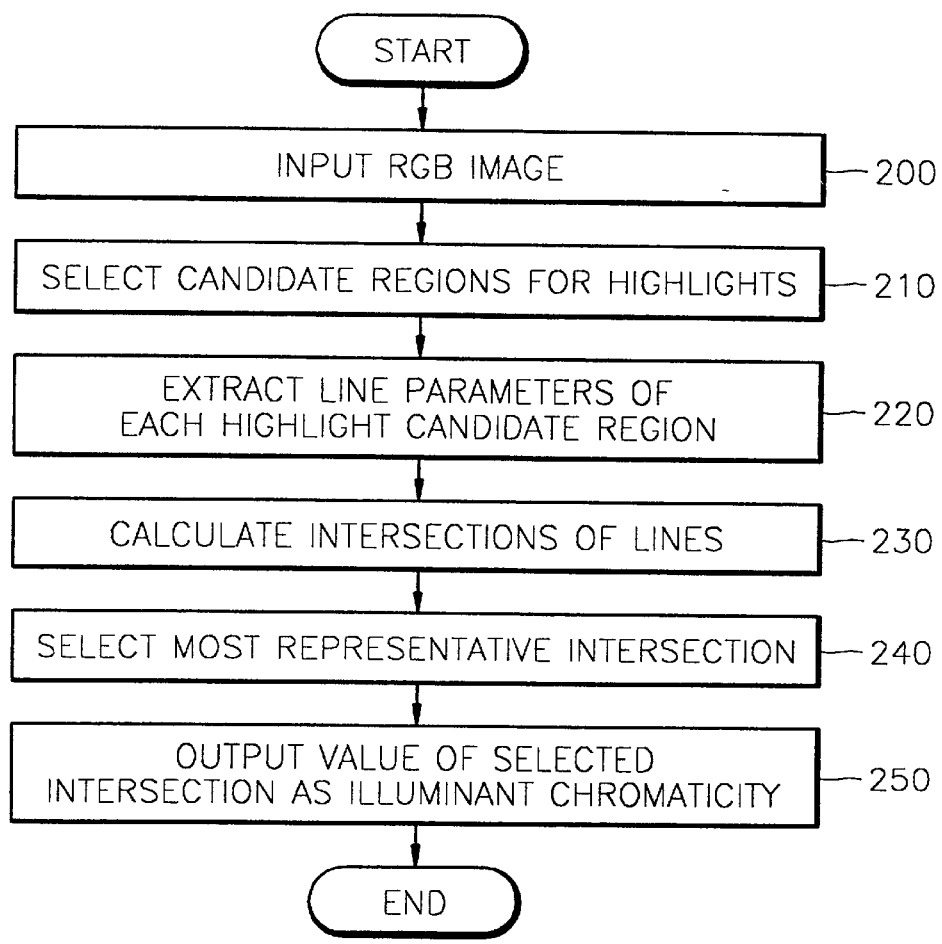
FIG. 2 is a flowchart for showing a procedure of estimating illuminant chromaticity according to a highlight estimate scheme.

The highlight detector 41 extracts highlight regions from the input color image and performs the function corresponding to the step 210 of FIG. 2.

The highlight parameter calculator 42 maps the highlight regions extracted by the highlight detector 41 to chromaticity coordinates and calculates geometric presentation parameters of the shape of the distribution of chromaticity coordinates. The geometric presentation parameters are slopes and intercepts which are line parameters in the embodiment of the present invention. The highlight parameter calculator 42 performs the function corresponding to the step 220 of FIG. 2.

The perceived illumination illuminant chromaticity estimator 43 estimates the illuminant chromaticity of the input color image according to a perceived illumination estimate scheme. A detailed description of the operation of the perceived illumination illuminant chromaticity estimator 43 will be set forth later.

The correct chromaticity calculator 44 selects three lines, which are adjacent to illuminant chromaticity (px, py) estimated by the perceived illumination illuminant chromaticity estimator 43, among lines plotted according to the line parameters. Then, the correct chromaticity calculator 44 calculates the points of intersection among the selected three lines and determines the point of intersection nearest to the illuminant chromaticity (px, py) estimated by the perceived illumination illuminant chromaticity estimator 43 as a final illuminant chromaticity. The number of selected lines is not limited to three. The correct chromaticity calculator 44 may select four or five lines. In this embodiment, among the points of intersection produced by the selected three lines, the point of intersection nearest to the illuminant chromaticity (px, py) is determined as the final illuminant chromaticity. In another embodiment according to the present invention, the final illuminant chromaticity may be determined by the average of the points of intersection of the three lines, or another similar method may be used.

The perceived illumination illuminant chromaticity estimator 43 includes an image average calculator 43a, a self-luminous threshold setting unit 43b, a self-luminous region remover 43c, a self-luminous threshold change determiner 43d and an illuminant chromaticity calculator 43e.

The image average calculator 43a receives the input color image from the image input unit 40 or the color image, from which self-luminous regions have been removed, transmitted from the self-luminous threshold change determiner 43d, and calculates the average value of the color image. The image average calculator 43 performs the function corresponding to the step 130 of FIG. 1.

The self-luminous threshold setting unit 43b multiplies the average value of the color image by a predetermined coefficient to set a self-luminous threshold. The self-luminous threshold setting unit 43b performs the function corresponding to the step 140 of FIG. 1.

The self-luminous region remover 43c removes from the color image the pixels of self-luminous regions that have chromaticity coordinates exceeding the self-luminous threshold,.

The self-luminous threshold change determiner 43d transmits the color image, from which the self-luminous regions have been removed, to the image average calculator 43a when the difference between the current self-luminous threshold and a preceding self-luminous threshold exceeds a predetermined value near to 0. Alternatively, the self-luminous threshold change determiner 43d transmits the color image, from which the self-luminous regions have been removed, to the illuminant chromaticity calculator 43e when the difference between the current and preceding self-luminous thresholds is smaller than the predetermined value near to 0.

The illuminant chromaticity calculator 43e finally calculates illuminant chromaticity from the average value of the color image, from which the self-luminous regions have been removed, according to the perceived illumination estimate scheme. The illuminant chromaticity calculator 43e performs the function corresponding to the step 170 of FIG. 1.

A procedure of estimating illuminant chromaticity using perceived illumination and highlights according to the present invention will now be described in detail. Once a color image is input, highlight regions are extracted from the input color image. In other words, the average brightness of the entire color image is obtained from the input color image, and regions brighter than a predetermined reference brightness are determined as the highlight regions in the input color image. The predetermined reference brightness is calculated as shown in Equation (6).

Next, the highlight regions are mapped to chromaticity coordinates, and a predetermined number of chromaticity coordinates, which indicate the direction of a change in chromaticity according to a change in brightness, are extracted. Line parameters are calculated based on the extracted chromaticity coordinates.

Meanwhile, the illuminant chromaticity of the input color image is estimated according to the perceived illumination estimate scheme as follows. Primarily, the average value of the color image is calculated by Equation (3). The calculated average value of the color image is multiplied by a predetermined coefficient by Equation (4) to set a self-luminous threshold. Self-luminous regions having chromaticity coordinates exceeding the self-luminous threshold are removed from the color image. The procedure from the step of calculating the average value of a color image to the step of removing self-luminous regions from the color image is repeated until the difference between a current self-luminous threshold and a preceding self-luminous threshold is smaller than a predetermined value. When the difference between current and preceding self-luminous thresholds is smaller than the predetermined value, calculation of illuminant chromaticity according to the perceived illumination estimate scheme is performed using the average value of a current color image, from which self-luminous regions have been removed, by Equation (5).

Among lines plotted according to the line parameters, three lines, which are adjacent to illuminant chromaticity estimated by the perceived illumination estimate scheme, are selected. Among the points of intersection among the selected three lines, the point of intersection nearest to the illuminant chromaticity estimated by the perceived illumination estimate scheme is determined as final illuminant chromaticity. In this case, selecting three lines is just an example, and four or five lines may be selected in another embodiment. In this embodiment, among the points of intersection among the selected three lines, the intersection nearest to the illuminant chromaticity estimated by the perceived illumination estimate scheme is determined as the final illuminant chromaticity. However, in another embodiment according to the present invention, the final illuminant chromaticity may be determined by the average of the points of intersection among the three lines, or a similar method may be used.

A perceived illumination and highlight combined method according to the present invention is compared with a method using perceived illumination and a method using highlights in Table 1. In tests, input images are obtained by photographing objects having the same structure under standard illuminations such as Horizon (HRZ), Incandescent (INC), Cool white (CLW), Daylight 5000 K (D50), Daylight 6000 K (D60), Daylight 6500 K (D65) and Daylight 7500 K (D75) which generally include illuminant components experienced in daily life.

TABLE 1

| The method using perceived illumination (Illumination booth: Kodak DCS-420) | | | | | | |
|---|---|---|---|---|---|---|
| Illumination | Reference_x | Reference_y | Estimation_x | Estimation_x | Distance_xy | Error (%) |
| HRZ | 0.5030 | 0.4120 | 0.4634 | 0.3722 | 0.0561 | 12.325 |
| INC | 0.4590 | 0.4110 | 0.4435 | 0.4048 | 0.0167 | 3.665 |
| CLW | 0.3790 | 0.3910 | 0.3868 | 0.3982 | 0.0106 | 2.330 |
| D50 | 0.3520 | 0.3680 | 0.3576 | 0.3702 | 0.0060 | 1.321 |

TABLE 1-continued

The method using perceived illumination (Illumination booth: Kodak DCS-420)

| Illumination | Reference_x | Reference_y | Estimation_x | Estimation_x | Distance_xy | Error (%) |
|---|---|---|---|---|---|---|
| D65 | 0.3170 | 0.3450 | 0.3238 | 0.3535 | 0.0109 | 2.390 |
| D75 | 0.3020 | 0.3320 | 0.3087 | 0.3473 | 0.0167 | 3.667 |
| | | | Average error | | | 4.283 |

*Error = dif_x/0.456*100(%)

(0.456: vector size of 6500 K illuminant chromaticity)

TABLE 2

The method using highlights (Illumination booth: Kodak DCS-420)

| Illumination | Reference_x | Reference_y | Estimation_x | Estimation_x | Distance_xy | Error (%) |
|---|---|---|---|---|---|---|
| HRZ | 0.5030 | 0.4120 | 0.5344 | 0.3757 | 0.0480 | 10.5367 |
| INC | 0.4590 | 0.4110 | 0.5117 | 0.4058 | 0.0530 | 11.6254 |
| CLW | 0.3790 | 0.3910 | 0.3969 | 0.4003 | 0.0202 | 4.4283 |
| D50 | 0.3520 | 0.3680 | 0.3662 | 0.3568 | 0.0181 | 3.9703 |
| D65 | 0.3170 | 0.3450 | 0.3237 | 0.3388 | 0.0091 | 2.0040 |
| D75 | 0.3020 | 0.3320 | 0.3135 | 0.3347 | 0.0118 | 2.5933 |
| | | | Average error | | | 5.8597 |

*Error = dif_x/0.456*100(%)

(0.456: vector size of 6500 K illuminant chromaticity)

TABLE 3

The combined method of the present invention (Photographing within a laboratory: Kodak DCS-420)

| Illumination | Reference_x | Reference_y | Estimation_x | Estimation_x | Distance_xy | Error (%) |
|---|---|---|---|---|---|---|
| HRZ | 0.5030 | 0.4120 | 0.4989 | 0.3620 | 0.0482 | 10.5758 |
| INC | 0.4590 | 0.4110 | 0.4380 | 0.3880 | 0.0311 | 6.8372 |
| CLW | 0.3790 | 0.3910 | 0.3993 | 0.4081 | 0.0265 | 5.8269 |
| D50 | 0.3520 | 0.3680 | 0.3634 | 0.3763 | 0.0141 | 3.0957 |
| D65 | 0.3170 | 0.3450 | 0.3283 | 0.3526 | 0.0136 | 2.9896 |
| D75 | 0.3020 | 0.3320 | 0.3022 | 0.3542 | 0.0222 | 4.8738 |
| | | | Average error | | | 5.6998 |

*Error = dif_x/0.456*100(%)

(0.456: vector size of 6500 K illuminant chromaticity)

TABLE 4

The combined method of the present invention (Photographing outside the laboratory: Kodak DC-2600 (%))

| | Perceived illumination estimate scheme [K] | | | | Combined method [K] | | | |
|---|---|---|---|---|---|---|---|---|
| | H | F | D | All | H | F | D | All |
| First group | 5.79% | 6.01% | 6.72% | 6.18% | 5.91% | 6.01% | 6.61% | 6.18% |
| Second group | 4.84% | 5.93% | 9.27% | 8.69% | 5.66% | 8.24% | 9.46% | 9.07% |
| Third group | 5.00% | 7.29% | 7.60% | 7.32% | 5.00% | 9.57% | 7.35% | 9.06% |
| Total error | | 7.40% | | | | 7.98% | | |

TABLE 5

The combined method of the present invention
(Photographing outside the laboratory: Kodak DC-260)

| | Perceived illumination estimate scheme [K] | | | | Combined method [K] | | | |
|---|---|---|---|---|---|---|---|---|
| | H | F | D | All | H | F | D | All |
| First group | 194 | 286 | 730 | 403 | 146 | 287 | 717 | 384 |
| Second group | 142 | 315 | 1068 | 943 | 139 | 490 | 1071 | 957 |
| Third group | 175 | 402 | 866 | 493 | 175 | 523 | 843 | 583 |
| Total error | | 647 | | | | 626 | | |

(T: Color temperature)

In Tables 4 and 5, H is halogen, F is fluorescent, and D is daylight. The first group is a case in which measurement of a representative scene illuminant is possible. The second group is a case in which a scene illuminant can be estimated by a person but cannot be accurately measured. The third group is a case in which it is difficult to select a representative illuminant due to a composite illuminant.

The following description concerns an illuminant chromaticity converting apparatus. In utilizing an extracted illuminant chromaticity, the color of an object is compensated for using the extracted illuminant chromaticity, or a different illuminant can be perceived by converting the illuminant chromaticity in an image using the extracted illuminant.

Among applications of illuminant chromaticity, conversion of illuminant chromaticity is most effectively used. In this application, conversion of illuminant chromaticity is performed using extracted illuminant chromaticity and information on a desired illuminant. In converting illuminant chromaticity, only the chromaticity of an illuminant may be changed or both of the brightness information and chromaticity may be changed. When changing only the chromaticity of an illuminant, only the overall cast of an image is changed. When changing both the brightness information and the chromaticity of an illuminant, the range of the value of brightness is changed so that an image, which provides a different mood than an original image, can be produced.

Conversion of illuminant chromaticity can be performed using only the chromaticity coordinates (x, y) of an illuminant. However, through this conversion, only simple white balance is achieved, and the overall cast of a chromaticity converted image tends to be unnatural.

Figure 5:
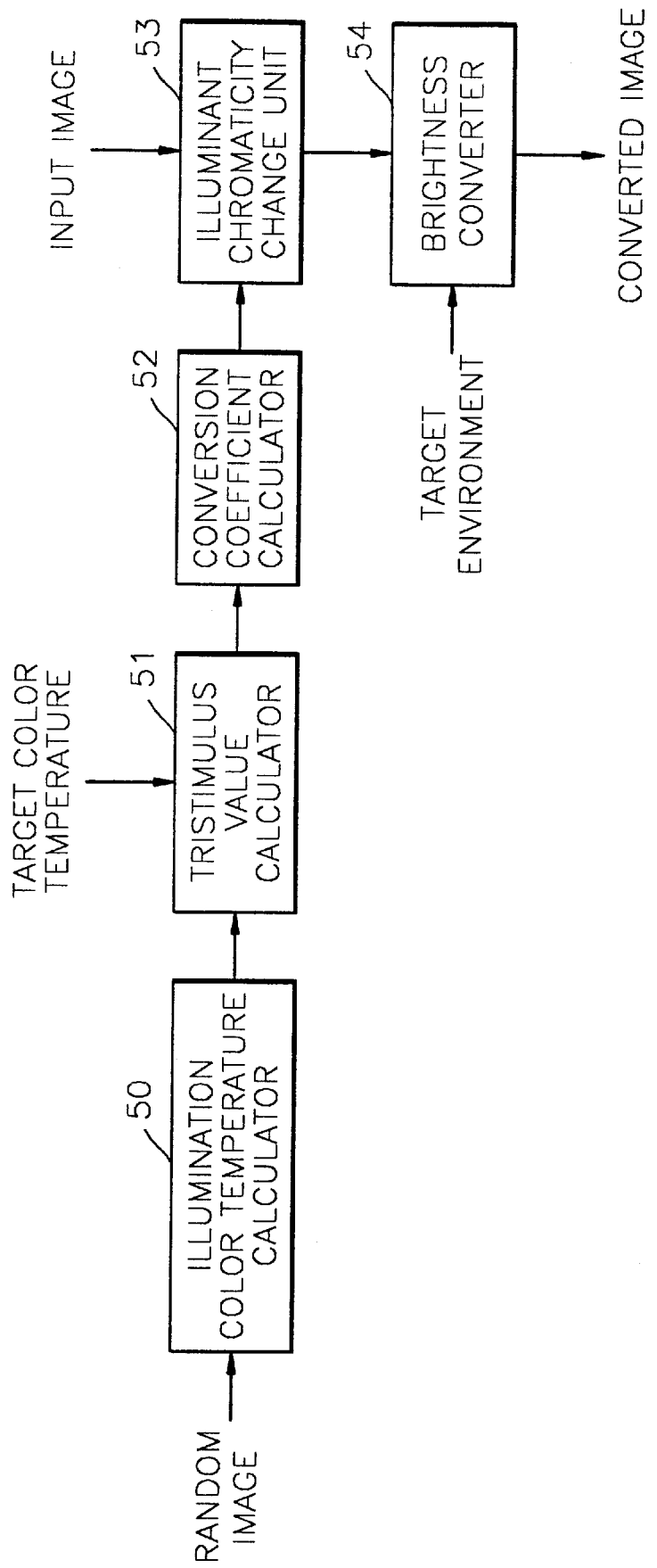
FIG. 5 is a block diagram of an illuminant chromaticity converting apparatus according to the present invention.

Referring to FIG. 5, a first embodiment of an illuminant chromaticity converting apparatus according to the present invention includes an illumination color temperature calculator 50, a tristimulus value calculator 51, a conversion coefficient calculator 52 and illuminant chromaticity change unit 53.

The illumination color temperature calculator 50 calculates a color temperature corresponding to the estimated illuminant chromaticity of a random color image.

The tristimulus value calculator 51 calculates a plurality of estimation reference color values corresponding to the color temperature calculated by the illumination color temperature calculator 50 and a plurality of target reference color values corresponding to a target color temperature. The plurality of estimation reference color values and the plurality of target reference color values are preferably XYZ values corresponding to 24 patches of a Macbeth color checker (MCC).

The conversion coefficient calculator 52 calculates conversion coefficients using the plurality of estimation reference color values and the plurality of target reference color values to create a conversion matrix.

The illuminant chromaticity change unit 53 applies the conversion matrix to an input color image to change the chromaticity of an illuminant.

A second embodiment of an illuminant chromaticity converting apparatus according to the present invention includes a brightness converter 54 in addition to the elements of the first embodiment. The brightness converter 54 calculates the average value of brightness of the input color image who's illuminant chromaticity has been changed and a shift offset corresponding to a target environment, adds the calculated shift offset to the RGB elements of the input color image who's illuminant chromaticity has been changed, and expands the contrast of the input color image.

When the color cast of an image is changed in such a manner that a color temperature calculated from extracted illuminant chromaticity is converted to that of daylight (6500 K), and then the value of brightness of the image is additionally converted, the image can be seen as if it is obtained by photographing in sun light. This process is referred to as daylight conversion, and the conversion of the value of brightness is accomplished by an increase in direct current (DC) component and an increase in dynamic range.

The increase in DC component is to increase an overall value of brightness by adding a predetermined constant to each of the R, G and B values. The increase in dynamic range is an increase in contrast. By appropriately adjusting the DC component and dynamic range, the effect that an image is seen as if it is obtained by photographing under daylight can be achieved.

Equations for obtaining a shift offset corresponding to an aimed environment and a contrast value can be determined by a test. Six people participated in the test, and equations determined by the test in which various 35 images were used will be shown.

Primarily, in an intensity shift, the relation between the average value of brightness ($I\_avg=0.3*R+0.6*G+0.1*B$) calculated from the average RGB value of an image and a shift offset is as follows.

Daylight $$shift\ offset = -0.26042 * I\_avg + 50.3125$$

Sunset $$shift\ offset = -0.2083 * I\_avg + 11.25$$

Next, contrast adjustment is determined as follows.

Daylight

Expansion of the contrast by 10% occurs most frequently

Sunset
   Expansion of contrast of most of data is 0%, that is, expansion of contrast is meaningless.

As a result of applying the results of the test to images, appropriate daylight conversion effects can generally be obtained.

When the above approximating operation was performed, slight unnatural results were observed in some images under daylight. Accordingly, the shift offset of the value of brightness may be set to a certain value. In other words, there are two methods; one of increasing a shift offset by a predetermined value (e.g., 10) regardless of the value of brightness, and the other of increasing a shift offset according to the value of the function of the value of brightness. It was determined that the appropriate contrast was 10% which was set in the test. Since the former method generally presented stable results for most images, it is easy to use. In addition, the method does not include calculation of parameters related to the value of brightness, thereby reducing processing time. When the deviation of visual tests performed on people who participate in a test for an approximating operation is large, the approximating operation is difficult and a large error may occur. Consequently, it is effective to regularly increase a shift offset.

Under the sunset, particularly unnatural results are not observed in the images which are processed according to the function of the value of brightness, so that the value of function can be adapted.

It will be easily understood by those skilled in the art that the functional blocks of the illuminant chromaticity estimating apparatus of FIG. 4 and the illuminant chromaticity converting apparatus of FIG. 5 may be implemented as application specific integrated circuits (ASICs) in hardware or implemented as the combination of a universal computer and software executed in the computer.

The embodiments of the present invention may be made into a program which can be executed in a computer. The program can be read from a computer-readable medium and executed by a universal digital computer system. The computer-readable medium covers a storage medium such as a magnetic storage medium (e.g., a ROM, a floppy disk or a hard disk), an optical readable medium (e.g., a CD-ROM or a DVD) or carrier waves (e.g., transmission via the internet).

A recording medium stores modules in the form of program codes which can be executed in a computer. The modules include a module for receiving a color image, a module for extracting highlight regions from the color image, a module for mapping the highlight regions to chromaticity coordinates and calculating geometric presentation parameters of the shape of the distribution of chromaticity coordinates, a module for estimating illuminant chromaticity in the color image using a perceived illumination estimate scheme, and a module for selecting a predetermined number of geometric presentation parameters near the estimated illuminant chromaticity among the geometric presentation parameters and calculating final illuminant chromaticity using the selected geometric presentation parameters.

The module for estimating illuminant chromaticity using a perceived illumination estimate scheme includes program codes for executing modules of calculating the average value of the color image, multiplying the average value of the color image by a predetermined coefficient and setting a result value as a self-luminous threshold, removing self-luminous regions having chromaticity coordinates exceeding the self-luminous threshold from the color image, repeating from the module of calculating the average value of a color image to the module of removing self-luminous regions from the color image until the difference between a current self-luminous threshold and a previous self-luminous threshold is smaller than a predetermined value, and calculating illuminant chromaticity from the average value of the color image from which the self-luminous regions have been removed.

A recording medium stores program codes for executing modules of calculating a color temperature corresponding to the estimated illuminant chromaticity in a random color image, calculating a plurality of estimation reference color values corresponding to the calculated color temperature, calculating a plurality of target reference color values corresponding to a target color temperature, calculating conversion coefficients using the plurality of estimation reference color values and the plurality of target reference color values to produce a conversion matrix, and applying the conversion matrix to an input color image to change the chromaticity of an illuminant in the input color image, in a computer.

The recording medium may also store program codes for executing a module of calculating the average value of brightness of the input color image who's illuminant chromaticity has been changed and a shift offset corresponding to a target environment, adding the calculated shift offset to the RGB elements of the input color image of which illuminant chromaticity has been changed, and expanding the contrast of the input color image, in a computer.

The functional modules for the implementation of the present invention can be easily embodied by programmers in the art of the present invention.

According to the present invention, the illuminant chromaticity information from an image visually perceived by a person can be digitized, and illuminant information can be effectively and stably extracted by selective removal of self-luminous regions. The present invention may be implemented as software, and thus does not require a hardware apparatus such as an illuminant detector of a conventional technology, thereby reducing the manufacturing cost of an image input apparatus. In addition, the present invention improves the large amount of calculation time which is the major problem of a conventional software method of directly obtaining the color of an illuminant from an image, thereby reducing image processing time and obtaining more accurate illuminant color information. Moreover, the present invention can create an image giving different feeling than an original image by conversion of illuminant chromaticity and the value of brightness, thereby realizing a special function such as a function of improving the quality of an image.

The present invention has been described by way of exemplary embodiments to which it is not limited. Variations and modifications will occur to those skilled in the art without departing from the scope of the invention as set out in the following claims.

What is claimed is:

1. An illuminant chromaticity estimating apparatus comprising:
   an image input unit for receiving a color image;
   a highlight detector for extracting highlight regions from the color image;
   a highlight parameter calculator for mapping the highlight regions to chromaticity coordinates and calculating geometric presentation parameters of the shape of the distribution of chromaticity coordinates;
   a perceived illumination illuminant chromaticity estimator for estimating illuminant chromaticity in the color image using a perceived illumination estimate scheme; and a correct chromaticity calculator for selecting from among the geometric presentation parameters a predetermined number of geometric presentation parameters near the illuminant chromaticity estimated by the perceived illumination illuminant chromaticity estimator and calculating final illuminant chromaticity using the selected geometric presentation parameters.

2. The illuminant chromaticity estimating apparatus of claim 1, wherein the perceived illumination illuminant chromaticity estimator comprises:

an image average calculator for calculating the average value of the color image;

a self-luminous threshold setting unit for multiplying the average value of the color image by a predetermined coefficient and setting a result value as a self-luminous threshold;

a self-luminous region remover for removing self-luminous regions having chromaticity coordinates exceeding the self-luminous threshold from the color image;

a self-luminous threshold change determiner for outputting the color image from which the self-luminous regions have been removed instead of the color image input to the image average calculator when the difference between a current self-luminous threshold and a previous self-luminous threshold exceeds a predetermined value; and an illuminant chromaticity calculator for calculating illuminant chromaticity from the average value of the color image from which the self-luminous regions have been removed.

3. An illuminant chromaticity converting apparatus comprising:

an illumination color temperature calculator for calculating a color temperature corresponding to the estimated illuminant chromaticity in a random color image;

a tristimulus value calculator for calculating a plurality of estimation reference color values corresponding to the color temperature calculated by the illumination color temperature calculator and a plurality of target reference color values corresponding to a target color temperature;

a conversion coefficient calculator for calculating conversion coefficients using the plurality of estimation reference color values and the plurality of target reference color values to produce a conversion matrix; and an illuminant chromaticity change unit for applying the conversion matrix to an input color image to change the chromaticity of an illuminant in the input color image.

4. The illuminant chromaticity converting apparatus of claim 3, further comprising a brightness converter for calculating the average value of brightness of the input color image of which illuminant chromaticity has been changed and a shift offset corresponding to a target environment, adding the calculated shift offset to the RGB elements of the input color image of which illuminant chromaticity has been changed, and expanding the contrast of the input color image.

5. The illuminant chromaticity converting apparatus of claim 3, wherein the plurality of estimation reference color values and the plurality of target reference color values are XYZ values of 24 colors in a Macbeth color checker.

6. An illuminant chromaticity estimating method comprising the steps of:

(a) receiving a color image;

(b) extracting highlight regions from the color image;

(c) mapping the highlight regions to chromaticity coordinates and calculating geometric presentation parameters of the shape of the distribution of chromaticity coordinates;

(d) estimating illuminant chromaticity in the color image using a perceived illumination estimate scheme; and (e) selecting from among the geometric presentation parameters a predetermined number of geometric presentation parameters near the illuminant chromaticity estimated in the step (d) and calculating final illuminant chromaticity using the selected geometric presentation parameters.

7. The illuminant chromaticity estimating method of claim 6, wherein the step (d) comprises the sub steps of:

(d1) calculating the average value of the color image;

(d2) multiplying the average value of the color image by a predetermined coefficient and setting a result value as a self-luminous threshold;

(d3) removing self-luminous regions having chromaticity coordinates exceeding the self-luminous threshold from the color image;

(d4) repeating the steps (d1) through (d3) until the difference between a current self-luminous threshold and a previous self-luminous threshold is smaller than a predetermined value; and (d5) calculating illuminant chromaticity from the average value of the color image of which self-luminous regions have been removed.

8. The illuminant chromaticity estimating method of claim 6, wherein the step (b) comprises the steps of obtaining the average brightness of the overall input color image, and determining regions brighter than predetermined reference brightness in the input color image as highlight regions.

9. The illuminant chromaticity estimating method of claim 6, wherein the step (c) comprises the steps of mapping the highlight regions to chromaticity coordinates; extracting a predetermined number of chromaticity coordinates defining the direction of change in chromaticity in a chromaticity diagram, the change in chromaticity depending on change in brightness; and calculating line parameters based on the extracted chromaticity coordinates.

10. The illuminant chromaticity estimating method of claim 9, wherein the step (e) comprises the steps of selecting a predetermined number of lines near the illuminant chromaticity estimated in the step (d) among lines plotted by the line parameters and calculating the final illuminant chromaticity using an intersection nearest to the illuminant chromaticity estimated in the step (d) among intersections of the selected lines.

11. An illuminant chromaticity converting method comprising the steps of:

(a) calculating a color temperature corresponding to the estimated illuminant chromaticity in a random color image;

(b) calculating a plurality of estimation reference color values corresponding to the calculated color temperature;

(c) calculating a plurality of target reference color values corresponding to a target color temperature;

(d) calculating conversion coefficients using the plurality of estimation reference color values and the plurality of target reference color values to produce a conversion matrix; and (e) applying the conversion matrix to an input color image to change the chromaticity of an illuminant in the input color image.

12. The illuminant chromaticity converting method of claim 11, further comprising the step of (f) calculating the average value of brightness of the input color image of which illuminant chromaticity has been changed and a shift offset corresponding to a target environment, adding the calculated shift offset to the RGB elements of the input color image of which illuminant chromaticity has been changed, and expanding the contrast of the input color image.

13. The illuminant chromaticity converting method of claim 11, wherein the plurality of estimation reference color values and the plurality of target reference color values are XYZ values of 24 colors in a Macbeth color checker.

14. A computer-readable recording medium for recording an illuminant chromaticity estimating program therein, wherein the program comprises the modules of:

(a) receiving a color image;

(b) extracting highlight regions from the color image;

(c) mapping the highlight regions to chromaticity coordinates and calculating geometric presentation parameters of the shape of the distribution of chromaticity coordinates;

(d) estimating illuminant chromaticity in the color image using a perceived illumination estimate scheme; and (e) selecting from among the geometric presentation parameters a predetermined number of geometric presentation parameters near the illuminant chromaticity estimated in the step (d) and calculating final illuminant chromaticity using the selected geometric presentation parameters.

15. The recording medium of claim 14, wherein the module (d) comprises the modules of:

(d1) calculating the average value of the color image;

(d2) multiplying the average value of the color image by a predetermined coefficient and setting a result value as a self-luminous threshold;

(d3) removing self-luminous regions having chromaticity coordinates exceeding the self-luminous threshold from the color image;

(d4) repeating the steps (d1) through (d3) until the difference between a current self-luminous threshold and a previous self-luminous threshold is smaller than a predetermined value; and (d5) calculating illuminant chromaticity from the average value of the color image of which self-luminous regions have been removed.

16. A computer-readable recording medium for recording a illuminant chromaticity converting program therein, wherein the program comprises the modules of:

(a) calculating a color temperature corresponding to the estimated illuminant chromaticity in a random color image;

(b) calculating a plurality of estimation reference color values corresponding to the calculated color temperature;

(c) calculating a plurality of target reference color values corresponding to a target color temperature;

(d) calculating conversion coefficients using the plurality of estimation reference color values and the plurality of target reference color values to produce a conversion matrix; and (e) applying the conversion matrix to an input color image to change the chromaticity of, an illuminant in the input color image.

17. The recording medium of claim 16, wherein the program further comprises the module of (f) calculating the average value of brightness of the input color image of which illuminant chromaticity has been changed and a shift offset corresponding to a target environment, adding the calculated shift offset to the RGB elements of the input color image of which illuminant chromaticity has been changed, and expanding the contrast of the input color image.

* * * * *